United States Patent
Aguilar Mares et al.

(10) Patent No.: US 10,331,505 B2
(45) Date of Patent: Jun. 25, 2019

(54) APPLICATION PROGRAMMING INTERFACE (API) HUB

(71) Applicant: Microsoft Technology Licensing, LLC., Redmond, WA (US)

(72) Inventors: Carlos Aguilar Mares, Bellevue, WA (US); Bilal Alam, Sammamish, WA (US); Charles Lamanna, Bellevue, WA (US); J. Michael Stall, Woodinville, WA (US); Galin Iliev, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 218 days.

(21) Appl. No.: 15/199,847

(22) Filed: Jun. 30, 2016

(65) Prior Publication Data
US 2018/0004585 A1   Jan. 4, 2018

(51) Int. Cl.
| G06F 9/50 | (2006.01) |
| G06F 9/54 | (2006.01) |
| G06F 9/455 | (2018.01) |
| H04L 29/06 | (2006.01) |
| H04L 29/08 | (2006.01) |

(52) U.S. Cl.
CPC .......... *G06F 9/547* (2013.01); *G06F 9/45533* (2013.01); *G06F 9/45558* (2013.01); *G06F 9/50* (2013.01); *G06F 9/54* (2013.01); *H04L 63/10* (2013.01); *H04L 67/10* (2013.01); *G06F 2009/45595* (2013.01); *H04L 67/1008* (2013.01)

(58) Field of Classification Search
CPC .................. H04L 67/42; G06F 9/547
See application file for complete search history.

(56) References Cited

U.S. PATENT DOCUMENTS

| 8,745,194 B2 | 6/2014 | Uribe-Etxebarria Jimenez |
| 8,745,224 B2 | 6/2014 | Smith |
| 9,654,576 B2* | 5/2017 | Jolfaei ................. H04L 67/26 |
| 2004/0167984 A1 | 8/2004 | Herrmann |
| 2009/0300199 A1* | 12/2009 | Burns ................. H04L 41/0266 709/230 |
| 2011/0225060 A1 | 9/2011 | Dunmire et al. |
| 2013/0061335 A1 | 3/2013 | Schwabe |

(Continued)

OTHER PUBLICATIONS

"SOAP Connector APIs", Published on: Jul. 5, 2015 Available at: https://docs.oracle.com/cloud/latest/mobilecs_gs/MCSUA/GUID-A5CCD158-4977-4051-A8D8-5E2BECB2B6A8.htm#MCSUA-GUID-A5CCD158-4977-4051-A8D8-5E2BECB2B6A8.

(Continued)

*Primary Examiner* — El Hadji M Sall
(74) *Attorney, Agent, or Firm* — Shook, Hardy & Bacon L.L.P.

(57) ABSTRACT

Embodiments are directed to a system for controlling access to remote services, comprising an application programming interface (API) hub configured to provide an interface between a client application and one or more remote services. The client application accesses the API hub using a common data protocol, such as OData, that is not associated with the remote services. The API hub selects a connectors based upon the targeted remote service and maps a user context associated with messages received from the client application to remote service credentials associated with the targeted remote service.

20 Claims, 3 Drawing Sheets

(56) References Cited

U.S. PATENT DOCUMENTS

| | | | |
|---|---|---|---|
| 2013/0132584 A1* | 5/2013 | Palladino | H04L 65/40 709/226 |
| 2014/0181306 A1 | 6/2014 | Kothamasu et al. | |
| 2014/0344153 A1 | 11/2014 | Raj et al. | |
| 2015/0095923 A1 | 4/2015 | Sarid | |
| 2015/0234639 A1 | 8/2015 | Allsbrook | |

OTHER PUBLICATIONS

"REST Connector APIs", Published on: Sep. 12, 2015 Available at: https://docs.oracle.com/cloud/latest/mobilecs_gs/MCSUA/GUID-12D976D7-5FCA-49C1-8D85-44A9BC438254. httm#MCSUA-GUID-12D976D7-5FCA-49C1-8D85-44A9BC438254.

* cited by examiner

APPLICATION PROGRAMMING INTERFACE (API) HUB

BACKGROUND

Developers creating applications must make specific decisions regarding, for example, application type, deployment strategy, programming language, and security, performance, and usability attributes. If the application is going to use third-party services, such as a cloud-based software as a service (SaaS), then developer must also determine what application programming interfaces (APIs) are needed to interact with those services. For example, the developer must determine what specific APIs to use to access third-party storage, email, database, or other applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are directed to a system for controlling access to remote services, comprising an application programming interface (API) hub configured to provide a first interface to a client application and to provide a second interface to one or more remote services. The first interface is configured to communicate messages using a common data protocol that is not associated with the one or more remote services. The second interface comprises API connectors that are selected based upon a targeted one of the remote services. The API hub is configured to map a user context associated with messages received on the first interface to remote service credentials associated with the targeted one of the remote services. The remote service credentials may comprise security tokens associated with a specific service and a specific user.

The API hub may be a component of a distributed computing network, and the client application may be running on a device remote from the distributed computing network or on a virtual machine on the distributed computing network. An access control service coupled to the API hub identifies whether a particular user has access to a connection to the targeted one of the remote services.

The API hub establishes a security boundary between the client application and the one or more remote services so that the client application cannot access the remote service credentials and the one or more remote services do not have access to the user context associated with messages received on the first interface. The API hub may enforce quota, rate limits, or usage parameters for accessing the one or more remote services.

The remote services may include, for example, storage services, database services, messaging services, Software as a Service (SaaS) platforms, collaboration and document management platforms, and customer relationship management (CRM) services.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The present disclosure relates generally to a system for controlling access to remote services, comprising an application programming interface (API) hub configured to provide an interface between a client application and one or more remote services.

An enterprise application creation service, such as PowerApps from Microsoft Corporation, allows employees allows users to quickly connect, create, and share applications using predefined templates. Applications can be created on any platform, such as Windows®, iOS, or Android®-based devices. Employees may use these templates to build their own applications to access an enterprise's data. Built-in connections and APIs connect the applications to cloud services and data sources. Connector APIs can be addressed from the applications in a common way to support Create Read Update Delete (CRUD) operations on data in third-party cloud-based sources. This allows business users to harness the power of data scattered throughout their organizations in both software-as-a-service and on-premises applications. The enterprise application creation service allows users and developers to build applications that share resources and connect to other services, such as Office 365, SalesForce®, OneDrive®, Dropbox®, etc. These applications can be built once and then consumed on any platform, such as Windows®, iOS, and Android® devices, without having to re-compile, design separate user interfaces (UIs) per platform.

The enterprise application creation service does not require users to code their applications, but instead provides templates as a starting point that can be modified using common productivity suite (i.e., presentation, spreadsheet, word processing applications) skills. The enterprise application creation service provides connectors for pulling or pushing data to other sources and services. Connections are established by logging into the service and then the connection is persisted to the enterprise application creation service and will be available on any device when the user logs into their account. A directory and identity management service, such as Azure Active Directory from Microsoft Corporation, provides authentication for users. Applications may be provided to users simply by typing in their email address and sharing the application with them without worrying about downloading the application, operating system (OS) compatibility, or other typical conflicts for enterprise applications.

Figure 1:
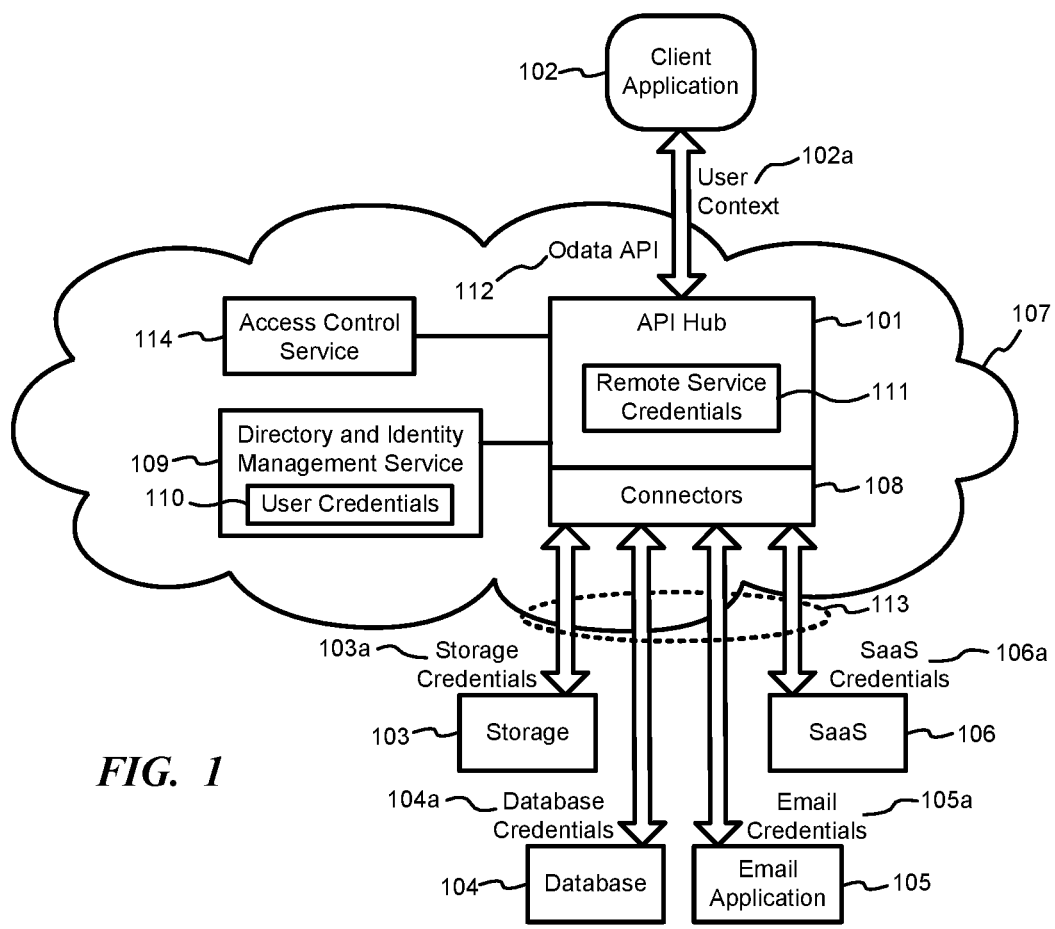
FIG. 1 is a block diagram of a system employing an API hub between client applications and other data sources and services.

FIG. 1 is a block diagram of a system employing an API hub 101 between client application 102 and other data sources and services 103-106. Client application 102 may be running on any platform, such as an application running on a smartphone in a browser, as a native file, or an OS application. The other data sources and services may include, for example, a storage provider 103, database provider 104, email application 105, or other services/SaaS 106. API hub 101 is running in a cloud service 107. Connectors 108 provide a common way for client application 102 to access the APIs for data sources and other services 103-106. Directory and identify management service 109 authenticates user credentials 110 for users of client application 102 on cloud service 107. During runtime, API hub 101 transforms the user credentials 110 for the user of client application 102 to the user credentials required by a specific connector 108. API hub 101 stores the user credentials associated with the client application 102 and applies any quota, rate limits, or usage parameters (e.g., number of API calls per minute, number of API calls per day, etc.) as appropriate for the user.

For example, a user's identity is authenticated by directory and identify management service 109 before the user can access client application 102. During runtime, client application 102 may need to access storage 103 and database 104. Each of the remote data sources and services 103-106 have their own set of credentials 103a-106a that are required for access. In this example, client application 102 is attempting to access storage 103 and database 104. Therefore, storage credentials 103a are required to access storage 103, and database credentials 104a are required to access database 104. API hub 101 stores the credentials 111 for the remote services and data sources 103-106, including storage credentials 103a and database credentials 104a. API hub 101 maps the user credentials in user context 102a with the appropriate remote service credentials 103a, 104a so that API calls from client application can be passed to the services and data sources 103 and 104.

API hub 101 provides a security boundary between remote data sources and services 103-106 and client application 102 because the remote data sources and services 103-106 do not know the actual user of the client application 102. Instead, the remote data sources and services 103-106 only see the remote service credentials 111 that are used by the API hub 101. There is no leakage between the user credentials and the remote service credentials, so not only does each the remote data sources and services 103-106 not know which user is accessing client application 102, but the client application 102 also does not have explicit access to the remote data sources and services 103-106 and does not know what remote service credentials 111 are being used to access each data source or service.

In one embodiment, client application 102 uses a common data protocol, such as OData (Open Data Protocol) APIs, 112 to make calls against remote data sources and services 103-106 to API hub 101. Then API hub 101 then translates or modifies the API call 112 from client service 102 to the proprietary API 113 used by the called remote data source or service. API hub 101 also applies quota, rate limits, or usage parameters that apply to the user context or the remote data sources services, such as limiting the number of calls per time period and/or per user. API hub 101 then forwards the API call to the appropriate remote data source or service. The response from the called remote data source or service is then relayed back to client application 102 through API hub 101.

When client application 102 is created, the developer provides login credentials to API hub 101 to allow client application 102 to access any required remote data sources and services 103-106. API hub 101 access the remote data sources and services 103-106 and obtains a security token 111 for each. The tokens are associated with a specific service and user. For example, API hub 101 may store a first token to access storage service 103 for a first user and a second token to access storage service 103 for a second user. Additional tokens are stored by API hub 101 for each additional remote service or data source to which each user has access rights.

API hub 101 also interacts with access control service 114, which specifies whether a particular user identifier has access to a particular connection to remote data sources and services 103-106. Access control service may also identify whether one user may access another user's connections, for example, when a first user with access to storage 103 grants permission to other users to access storage 103 using the first user's credentials.

The user cannot call the connector 108 directly. The user or client application 102 can only call to the API hub 101. When client application 102 attempts to access a remote storage service 103, API hub 101 verifies that the user identified in the user context 102a is on the access control list for that service 103. If the user is allowed access, then API hub 101 provides the appropriate token 103a to the connector 108 for storage service 103. Using that token 103a, connector 108 makes a call 113 to storage service 103 to perform the desired operation.

Figure 2:
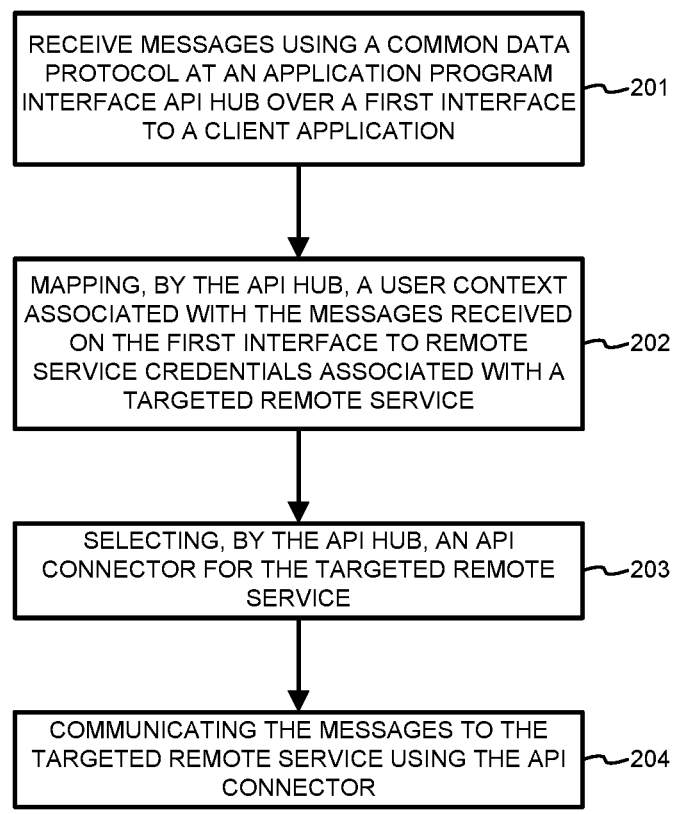
FIG. 2 is a flowchart illustrating a method for controlling access to remote services.

FIG. 2 is a flowchart illustrating a method for controlling access to remote services. In step 201, messages are received using a common data protocol at an application programming interface (API) hub over a first interface to a client application. The common data protocol is not associated with the remote services. The messages may comprise, for example, Create Read Update Delete (CRUD) operations.

In step 202, the API hub maps a user context associated with the messages received on the first interface to remote service credentials associated with a targeted remote service. In step 203, the API hub selects an API connector for the targeted remote service. The remote service credentials may comprise security tokens associated with a specific service and a specific user.

In step 204, the API hub communicates the messages to the targeted remote service using the API connector. The API connector is associated with a data protocol that is specific to the targeted remote service.

The API hub may receive information from an access control service. Metadata from the access control service contains user identity and security group membership. The API hub maps this data with the internal access control list (ACL) to decide if the user has access on the connection.

Figure 3:
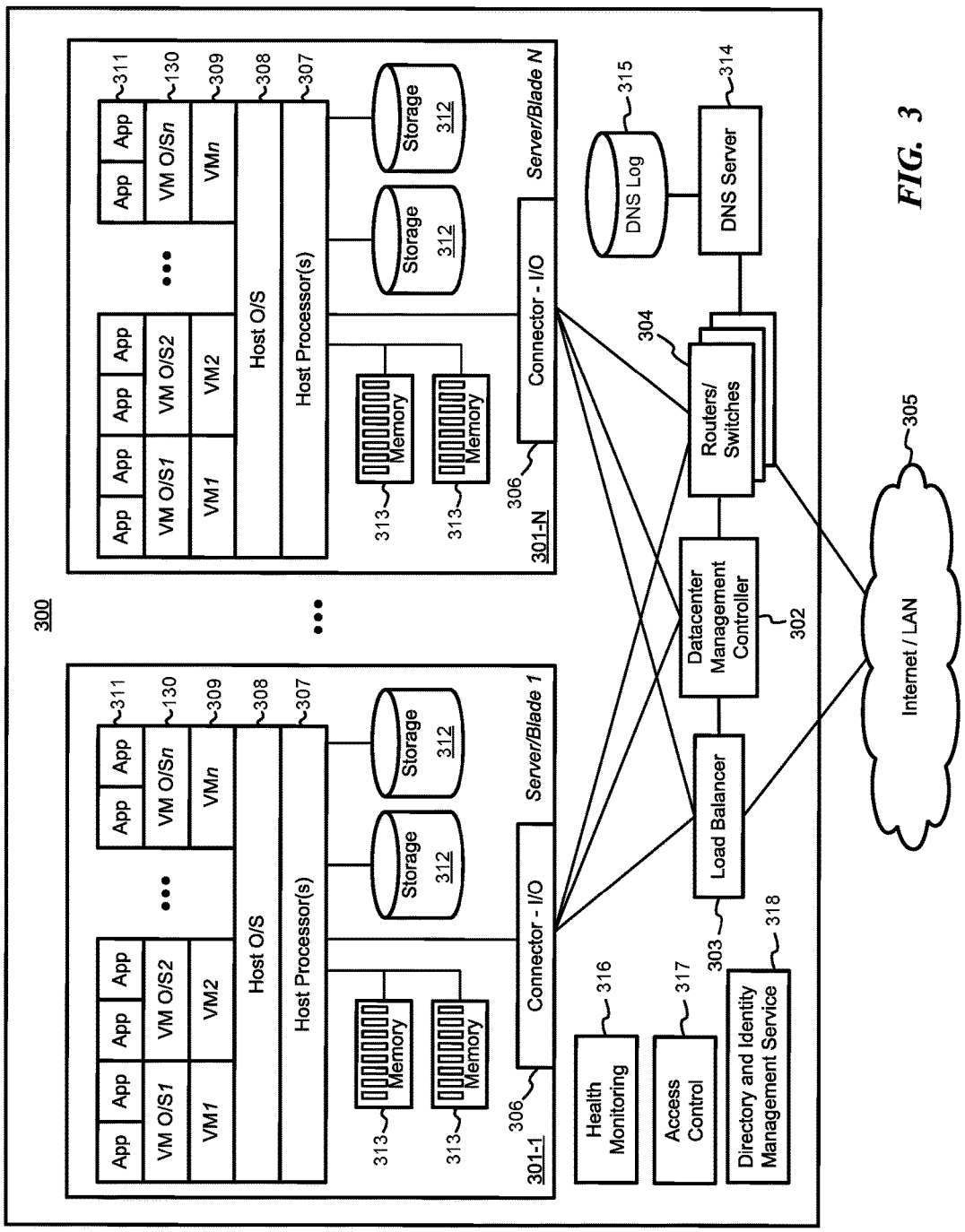
FIG. 3 is a high level block diagram of an example datacenter that provides cloud computing services or distributed computing services.

The API hub may be a component of a distributed computing network, such as the system illustrated in FIG. 3. The client application may be running on a device that is remote from the distributed computing network. Alternatively, the client application may be running on a virtual machine on the distributed computing network.

The API hub establishes a security boundary between the client application and the remote services so that the client application cannot access the remote service credentials and the one or more remote services do not have access to the user context associated with messages received on the first interface.

The API hub may enforce quota, rate limits, or usage parameters for accessing the remote services. The remote services may comprise, for example, storage services, database services, messaging services, Software as a Service (SaaS) platforms, collaboration and document management platforms, and customer relationship management (CRM) services.

FIG. 3 is a high level block diagram of an example datacenter 300 that provides cloud computing services or distributed computing services. These services may include API hub and connector services as disclosed herein. A plurality of servers 301 are managed by datacenter management controller 302. Load balancer 303 distributes requests and workloads over servers 301 to avoid a situation wherein a single server may become overwhelmed. Load balancer 303 maximizes available capacity and performance of the resources in datacenter 300. Routers/switches 304 support data traffic between servers 301 and between datacenter 300 and external resources and users (not shown) via an external network 305, which may be, for example, a local area network (LAN) or the Internet.

Servers 301 may be standalone computing devices and/or they may be configured as individual blades in a rack of one or more server devices. Servers 301 have an input/output (I/O) connector 306 that manages communication with other database entities. One or more host processors 307 on each server 301 run a host operating system (O/S) 308 that supports multiple virtual machines (VM) 309. Each VM 309 may run its own O/S so that each VM O/S 130 on a server is different, or the same, or a mix of both. The VM O/S's 130 may be, for example, different versions of the same O/S (e.g., different VMs running different current and legacy versions of the Windows® operating system). In addition, or alternatively, the VM O/S's 130 may be provided by different manufacturers (e.g., some VMs running the Windows® operating system, while others VMs are running the Linux® operating system). Each VM 309 may also run one or more applications (App) 311. Each server 301 also includes storage 312 (e.g., hard disk drives (HDD)) and memory 313 (e.g., RAM) that can be accessed and used by the host processors 307 and VMs 309 for storing software code, data, etc. In one embodiment, a VM 309 may function as the API hub as described herein. The APIs exposed by API hub are high-level service APIs as opposed to low level machine APIs (e.g., that control VM or hardware machine).

Datacenter 300 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 300 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 309 on server 301-1 to run their applications 311. When demand for an application 311 increases, the datacenter 300 may activate additional VMs 309 on the same server 301-1 and/or on a new server 301-N as needed. These additional VMs 309 can be deactivated if demand for the application later drops.

Datacenter 300 may offer guaranteed availability, disaster recovery, and back-up services. For example, the datacenter may designate one VM 309 on server 301-1 as the primary location for the tenant's application and may activate a second VM 309 on the same or different server as a standby or back-up in case the first VM or server 301-1 fails. Database manager 302 automatically shifts incoming user requests from the primary VM to the back-up VM without requiring tenant intervention. Although datacenter 300 is illustrated as a single location, it will be understood that servers 301 may be distributed to multiple locations across the globe to provide additional redundancy and disaster recovery capabilities. Additionally, datacenter 300 may be an on-premises, private system that provides services to a single enterprise user or may be a publically accessible, distributed system that provides services to multiple, unrelated customers and tenants or may be a combination of both.

Domain Name System (DNS) server 314 resolves domain and host names into IP addresses for all roles, applications, and services in datacenter 300. DNS log 315 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 316 monitors the health of the physical systems, software, and environment in datacenter 300. Health monitoring 316 provides feedback to datacenter managers when problems are detected with servers, blades, processors, or applications in datacenter 300 or when network bandwidth or communications issues arise.

Access control service 317 determines whether users are allowed to access particular connections and services on cloud service 300. Directory and identify management service 318 authenticates user credentials for tenants on cloud service 300.

An example system for controlling access to remote services comprises an API hub configured to provide a first interface to a client application and to provide a second interface to one or more remote services, wherein the first interface configured to communicate messages using a common data protocol that is not associated with the one or more remote services, and wherein the second interface comprises API connectors that are selected based upon a targeted one of the remote services, the API hub configured to map a user context associated with messages received on the first interface to remote service credentials associated with the targeted one of the remote services.

In other embodiments, the API hub is a component of a distributed computing network, and wherein the client application is running on a device remote from the distributed computing network.

In other embodiments, the API hub is a component of a distributed computing network, and wherein the client application is running on a virtual machine on the distributed computing network.

In other embodiments, the system further comprises an access control service coupled to the API hub, the access control service configured to identify to the API hub whether a particular user has access to a connection to the targeted one of the remote services.

In other embodiments, the API hub is configured to establish a security boundary between the client application and the one or more remote services so that the client application cannot access the remote service credentials and the one or more remote services do not have access to the user context associated with messages received on the first interface.

In other embodiments, the API hub is configured to enforce quota, rate limits, or usage parameters for accessing the one or more remote services.

In other embodiments, the one or more remote services comprise services selected from storage services, database services, messaging services, Software as a Service (SaaS) platforms, collaboration and document management platforms, and customer relationship management (CRM) services.

In other embodiments, the remote service credentials comprise security tokens associated with a specific service and a specific user.

An example method for controlling access to remote services is implemented on a computer and comprises receiving messages using a common data protocol at an API hub over a first interface to a client application; mapping, by the API hub, a user context associated with the messages received on the first interface to remote service credentials associated with a targeted remote service; selecting, by the API hub, an API connector for the targeted remote service; and communicating the messages to the targeted remote service using the API connector.

In alternative embodiments of the method, the common data protocol is not associated with the remote services; and wherein the API connector is associated with a data protocol that is specific to the targeted remote service.

In alternative embodiments of the method, the messages comprise Create Read Update Delete (CRUD) operations.

In alternative embodiments of the method, the API hub is a component of a distributed computing network, and wherein the client application is running on a device remote from the distributed computing network.

In alternative embodiments of the method, the API hub is a component of a distributed computing network, and wherein the client application is running on a virtual machine on the distributed computing network.

In alternative embodiments, the method further comprises receiving, at the API hub, information from an access control service identifying whether a particular user has access to a connection to the targeted one of the remote services.

In alternative embodiments of the method, the API hub establishes a security boundary between the client application and the remote services so that the client application cannot access the remote service credentials and the one or more remote services do not have access to the user context associated with messages received on the first interface.

In alternative embodiments, the method further comprises enforcing, by the API hub, quota, rate limits, or usage parameters for accessing the remote services.

In alternative embodiments of the method, the one or more remote services comprise services selected from storage services, database services, messaging services, Software as a Service (SaaS) platforms, collaboration and document management platforms, and customer relationship management (CRM) services.

In alternative embodiments of the method, the remote service credentials comprise security tokens associated with a specific service and a specific user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for controlling access to remote services, comprising:
   an application programming interface (API) hub configured to provide a first interface to a client application and to provide a second interface to one or more remote services, wherein the first interface configured to communicate messages using a common data protocol that is not associated with the one or more remote services, and wherein the second interface comprises API connectors that are selected based upon a targeted one of the remote services;
   the API hub configured to map a user context associated with messages received on the first interface to remote service credentials associated with the targeted one of the remote services, wherein mapping comprises transforming user credentials associated with the user context into remote service credentials, the remote service credentials required to connect, using an API connector associated with the targeted one of the remote services, to the targeted one of the remote services.

2. The system of claim 1, wherein the API hub is a component of a distributed computing network, and wherein the client application is running on a device remote from the distributed computing network.

3. The system of claim 1, wherein the API hub is a component of a distributed computing network, and wherein the client application is running on a virtual machine on the distributed computing network.

4. The system of claim 1, further comprising:
   an access control service coupled to the API hub, the access control service configured to identify to the API hub whether a particular user has access to a connection to the targeted one of the remote services.

5. The system of claim 1, wherein the API hub is further configured to establish a security boundary between the client application and the one or more remote services, wherein establishing the security boundary restricts access, of the client application, to the remote service credentials.

6. The system of claim 1, wherein the API hub is further configured to establish a security boundary between the client application and the one or more remote services, wherein establishing the security boundary restricts access of the one or more remote services, to the user context associated with the messages received on the first interface.

7. The system of claim 1, wherein the API hub is configured to enforce quota, rate limits, or usage parameters for accessing the one or more remote services, wherein the one or more remote services comprise services selected from storage services, database services, messaging services, Software as a Service (SaaS) platforms, collaboration and document management platforms, and customer relationship management (CRM) services.

8. The system of claim 1, wherein the remote service credentials comprise security tokens associated with a specific service and a specific user.

9. A computer-implemented method for controlling access to remote services, comprising:
   receiving messages using a common data protocol at an application programming interface (API) hub over a first interface to a client application;
   mapping, by the API hub, a user context associated with the messages received on the first interface to remote service credentials associated with a targeted remote service, wherein mapping comprises transforming user credentials associated with the user context into the remote service credentials, the remote service credentials required to connect, using an API connector associated with the targeted remote service, to the targeted remote service;
   selecting, by the API hub, the API connector associated with the targeted remote service; and
   communicating the messages to the targeted remote service using the API connector.

10. The method of claim 9, wherein the common data protocol is not associated with the remote services; and wherein the API connector is associated with a data protocol that is specific to the targeted remote service.

11. The method of claim 9, wherein the messages comprise Create Read Update Delete (CRUD) operations.

12. The method of claim 9, wherein the API hub is a component of a distributed computing network, and wherein the client application is running on a device remote from the distributed computing network.

13. The method of claim 9, wherein the API hub is a component of a distributed computing network, and wherein the client application is running on a virtual machine on the distributed computing network.

14. The method of claim 9, further comprising:
receiving, at the API hub, information from an access control service identifying whether a particular user has access to a connection to the targeted one of the remote services.

15. The method of claim 9, wherein the API hub is further configured to establish a security boundary between the client application and the one or more remote services, wherein establishing the security boundary restricts access, of the client application, to the remote service credentials.

16. The method of claim 9, wherein the API hub is further configured to establish a security boundary between the client application and the one or more remote services, wherein establishing the security boundary restricts access of the one or more remote services, to the user context associated with the messages received on the first interface.

17. The method of claim 9, wherein the API hub is configured to enforce quota, rate limits, or usage parameters for accessing the one or more remote services, wherein the one or more remote services comprise services selected from storage services, database services, messaging services, Software as a Service (SaaS) platforms, collaboration and document management platforms, and customer relationship management (CRM) services.

18. The method of claim 9, wherein the remote service credentials comprise security tokens associated with a specific service and a specific user.

19. A computer system, comprising:

one or more processors;

system memory;

one or more computer-readable storage media having stored thereon computer-executable instructions that, when executed by the one or more processors, causes the processors to perform a method for controlling access to remote services, the processor operating to:

receive a message using a common data protocol at an application programming interface (API) hub over a first interface to a client application;

map, by the API hub, a user context associated with the message received on the first interface to remote service credentials associated with a targeted remote service, wherein mapping comprises transforming user credentials associated with the user context into the remote service credentials, the remote service credentials required to connect, using an API connector associated with the targeted remote service, to the targeted remote service;

select, by the API hub, an API connector for the targeted remote service; and communicate the message to the targeted remote service using the API connector.

20. The computer system of claim 19, wherein the API hub establishes a security boundary between the client application and the targeted remote service, wherein establishing the security boundary restricts access, of the client application, to the remote service credentials; or wherein the API hub establishes a security boundary between the client application and the targeted remote service, wherein establishing the security boundary restricts access, of the one or more remote services, to the user context associated with the messages received on the first interface.

* * * * *